US008874424B2

(12) United States Patent
Nielsen et al.

(10) Patent No.: US 8,874,424 B2
(45) Date of Patent: Oct. 28, 2014

(54) FAULT-RIDE-THROUGH METHOD, CONVERTER AND POWER GENERATING UNIT FOR A WIND TURBINE

(75) Inventors: Joergen Nygaard Nielsen, Virum (DK); Jan Thisted, Tjele (DK)

(73) Assignee: Siemens Aktiengesellschaft, Munich (DE)

( * ) Notice: Subject to any disclaimer, the term of this patent is extended or adjusted under 35 U.S.C. 154(b) by 318 days.

(21) Appl. No.: 13/306,118

(22) Filed: Nov. 29, 2011

(65) Prior Publication Data

US 2012/0150524 A1 Jun. 14, 2012

(30) Foreign Application Priority Data

Dec. 8, 2010 (EP) .................................... 10194143

(51) Int. Cl.
    *H02J 3/38* (2006.01)
    *H02H 3/247* (2006.01)
    *H02J 3/00* (2006.01)

(52) U.S. Cl.
    CPC ........... *H02J 3/386* (2013.01); *H02J 2003/007* (2013.01); *Y02E 40/76* (2013.01); *H02J 2003/001* (2013.01); *Y02E 10/763* (2013.01); *Y02E 60/76* (2013.01); *Y04S 40/22* (2013.01); *Y04S 10/545* (2013.01); *H02H 3/247* (2013.01)
    USPC ................................ 703/18; 290/44; 700/292

(58) Field of Classification Search
    USPC .................. 703/18; 290/44, 55; 700/286, 292
    See application file for complete search history.

(56) References Cited

U.S. PATENT DOCUMENTS

| 7,525,208 | B2 * | 4/2009 | Wobben ........................ 290/44 |
| 7,622,816 | B2 * | 11/2009 | Stahlkopf ..................... 290/44 |
| 7,638,983 | B2 * | 12/2009 | Park et al. ..................... 290/44 |
| 8,108,080 | B2 * | 1/2012 | Wakata et al. ................. 290/44 |
| 2011/0025059 | A1 * | 2/2011 | Helle et al. ..................... 290/44 |
| 2011/0095532 | A1 * | 4/2011 | Schubert et al. ............... 290/44 |
| 2011/0101927 | A1 * | 5/2011 | Drobnjak et al. ............... 322/21 |
| 2012/0104754 | A1 * | 5/2012 | Rudolf et al. .................. 290/44 |
| 2012/0286509 | A1 * | 11/2012 | Rafoth .......................... 290/44 |
| 2013/0234433 | A1 * | 9/2013 | Tsutsumi et al. ............... 290/44 |
| 2013/0264824 | A1 * | 10/2013 | Gupta et al. .................... 290/44 |

FOREIGN PATENT DOCUMENTS

| WO | WO 2007027141 A1 | 3/2007 |
| WO | WO 2009083447 A2 | 7/2009 |
| WO | WO 2010002402 A1 | 1/2010 |

OTHER PUBLICATIONS

Perdana, Abram "Dynamic Models of Wind Turbines" PhD Thesis, Chalmers U. Tech. (2008).*
Transpower "Generator Fault Ride Through (FRT) Investigation: Stage 1 Literature Review" Transpower New Zealand Ltd (Feb. 2009).*
Hansen, Anca D. & Michalke, Gabriele "Fault Ride-Through Capability of DFIG Wind Turbines" Renewable Energy, vol. 32, pp. 1594-1610 (2007).*

* cited by examiner

*Primary Examiner* — Kamini S Shah
*Assistant Examiner* — Jay B Hann (57) ABSTRACT

A fault-ride-through method is provided. The method includes detecting a voltage dip on a power line transmitting electric power. If a voltage dip is detected, the method includes reducing an active current and/or an active power to a specific value, which active current and/or active power is fed by a power generating unit at a feeding point into a power network having a plurality of power lines. Further, a converter of a power generating unit is provided, that is capable of implementing the fault-ride-through method. The power generating unit may be a part of a wind turbine in a wind farm.

15 Claims, 9 Drawing Sheets

FAULT-RIDE-THROUGH METHOD, CONVERTER AND POWER GENERATING UNIT FOR A WIND TURBINE

CROSS REFERENCE TO RELATED APPLICATIONS

This application claims priority of European Patent Office application No. 10194143.3 filed Dec. 8, 2010, which is incorporated by reference herein in its entirety.

FIELD OF INVENTION

The present invention describes an advanced fault-ride-through recovery method for a wind turbine. Moreover the invention describes a converter and a power generating unit comprising such a converter for a wind turbine and a wind farm with at least one wind turbine comprising such a power generating unit.

BACKGROUND OF INVENTION

If a distortion, such as a short circuit fault, occurs in the power grid, the power network system may get unstable. A temporary short circuit may occur, if for example the power lines are short circuit, power system components are malfunctioning or even brake down.

If a power generating unit detects a voltage dip, the active current fed into the grid is reduced. Particularly, in a prior art fault-ride-through control the active current fed into the power network via a connection grid is reduced as a function of the voltage-dip. This reduced active current is supplied into the connection grid for a comparably short period. Thereafter, the active power is increased to its pre-voltage-dip value.

Figure 1:
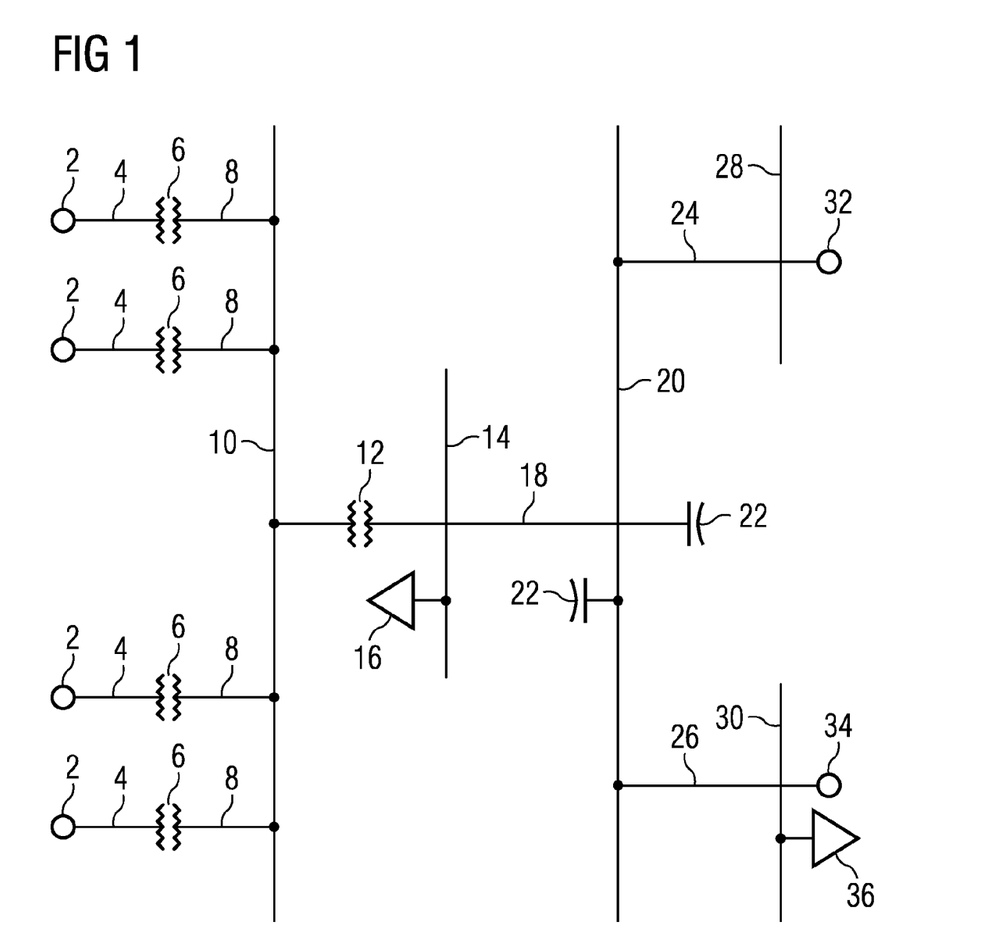
FIG. 1 shows a schematic of a wind farm with power generation units connected via a step-up transformer and power line to the point of interconnection of power transmission system network.

FIG. 1 shows an exemplary power transmission scenario for a wind park according to the state of the art. Such a wind park comprises a plurality of wind turbines 2 each generating a voltage of e.g. 0.7 kV. The power of the wind turbine 2 is transmitted by a wind turbine connection line 4 to a wind turbine transformer 6 transforming the voltage to e.g. 33 kV. This voltage is supplied by a power line 8 to a wind farm collector grid, i.e. low voltage bus bar, 10. The collector grid voltage value is transformed by a wind farm step-up transformer 12 to a transmission system voltage, e.g. 132 kV. A local load 16 is connected to branch point or first bus 14. From the branch point 14, also referred to as the grid branch radial, a connection line 18, is connected to a transmission network system at a point of common connection also referred to as a second bus 20. Switched capacitors 22 are connected as auxiliary components to the point of common connection 20. These auxiliary components are used for general reactive power control purposes of the system grid voltage.

Network point 28 of a transmission network constitutes an equivalent point of the transmission grid system with a power generating unit 32. This system is connected via interconnection line or first power line 24, the point of common connection 20 and regional transmission line or second power line 26 to a regional transmission network system represented with a second power generating unit 34 and a consumption point 30 of a regional grid system with consumers 36.

In an exemplary scenario electric power is transmitted from the network point or third bus 28 of the transmission network via the point of common connection 20 to the consumption point or fourth bus 30. Further, the power generated from the wind turbines 2 of the wind park is fed into the general transmission grid via the connection grid and connection line respectively, 18 and the point of common connection 20.

In an exemplary fault scenario the regional transmission line 26 is exposed to a severe and damaging short circuit fault and tripped off by the network protection relay. The faulted regional transmission line 26 is heavily damaged and can not be re-connected before it is repaired. The fault scenario causes that the consumption point 30 of the regional grid system no longer can be supplied with power from the wind farm and the grid system located in network point 28. The short circuit causes a severe voltage dip in the entire network system.

With reference to FIGS. 2 to 9 a state of the art fault-ride-through and post fault active power recovery control algorithm is explained.

Figure 2:
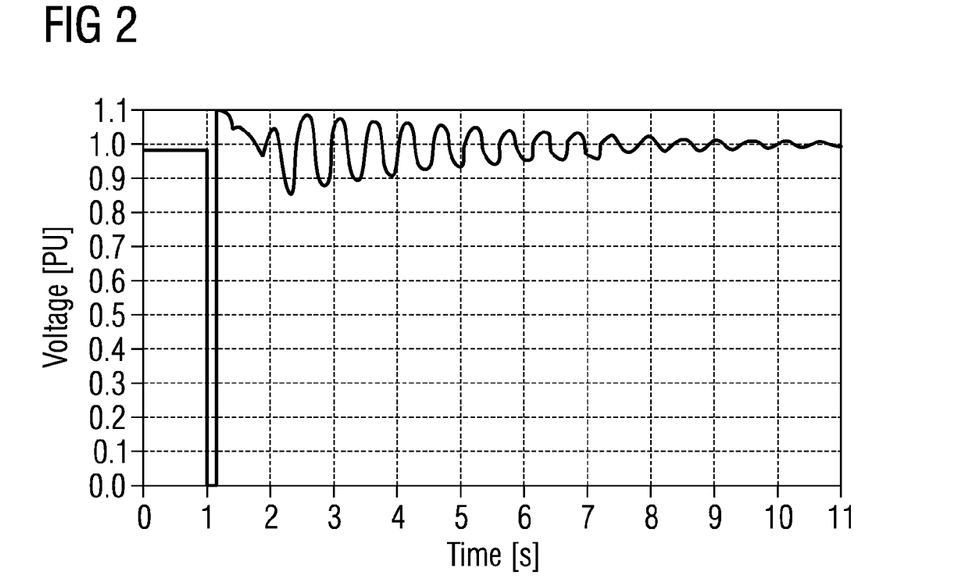
FIG. 2 shows a plot of a simulation of the relative voltage of the interconnection bus of a prior art fault-ride-through method, wherein forty-nine wind turbines are connected to a feed point of the power system network.

Particularly, FIGS. 2 to 5 show plots of a simulation of a scenario in which forty-nine wind turbines 2 are connected via the connection line 18 to the point of common connection 20. FIG. 2 shows a plot of a simulation of the relative voltage of the point of common connection 20. A 150 ms severe voltage dip occurs at a point of time of approximately 1 second when the short circuit fault occurs in the regional transmission line 26. When the fault is cleared, the voltage at the point of common connection 20 recovers and after the post fault voltage oscillations have faded out, the voltage in point 20 reaches the same voltage level as before the voltage dip.

Figure 3:
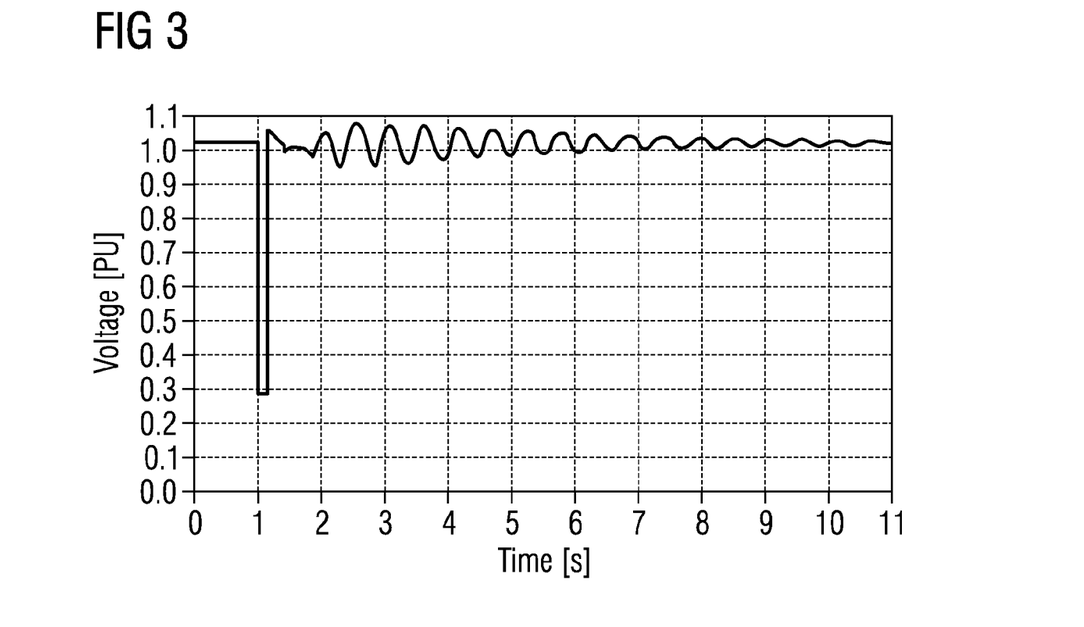
FIG. 3 shows a plot of a simulation of the relative voltage of one of the wind turbine connection lines of a prior art fault-ride-through method, wherein forty-nine wind turbines are connected to a feed point of the power system network.

FIG. 3 shows a plot of a simulation of the relative voltage of one of the wind turbine connection lines 4. Thus, FIG. 3 represents the relative voltage of the converter of the wind turbine 2. In this state of the art fault-ride-through control the converter reduces the active current fed into the wind turbine connection line 4 by a value depending on the value of the voltage dip.

Figure 4:
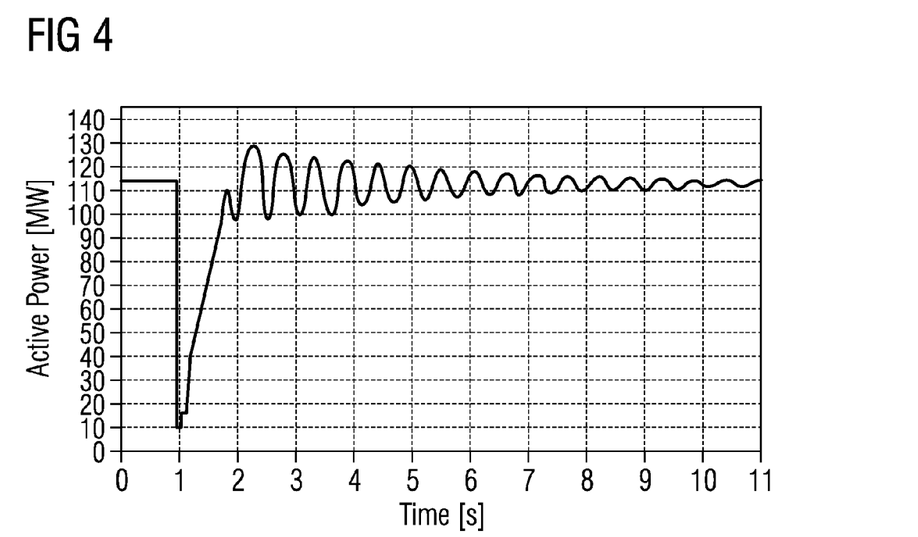
FIG. 4 shows a plot of a simulation of the active power of the aggregated wind farm supplied via the wind farm transformer of a prior art fault-ride-through method, wherein forty-nine wind turbines are connected to a feed point of the power system network.

FIG. 4 shows a plot of a simulation of the total active power from an aggregated wind farm transformer to the low voltage bus bar 10 of the wind farm transformer 12. In the state of the art fault-ride-through control a factor having a value from 0.5 to 1 defines the relationship between the current reduction and the value of the voltage dip. In the current scenario the reduction factor is approximately 0.5. The active power is reduced to 15% of its pre-fault value, as indicated in FIG. 4. The voltage at the wind turbine connection line 4 is about 30% of the pre-fault value as indicated in FIG. 3.

It is to be noted that the active power is ramped back within a comparably small time span of less than 1 second to its pre-fault value. Oscillations of the active power fade out essentially at the pre-voltage dip value.

Figure 5:
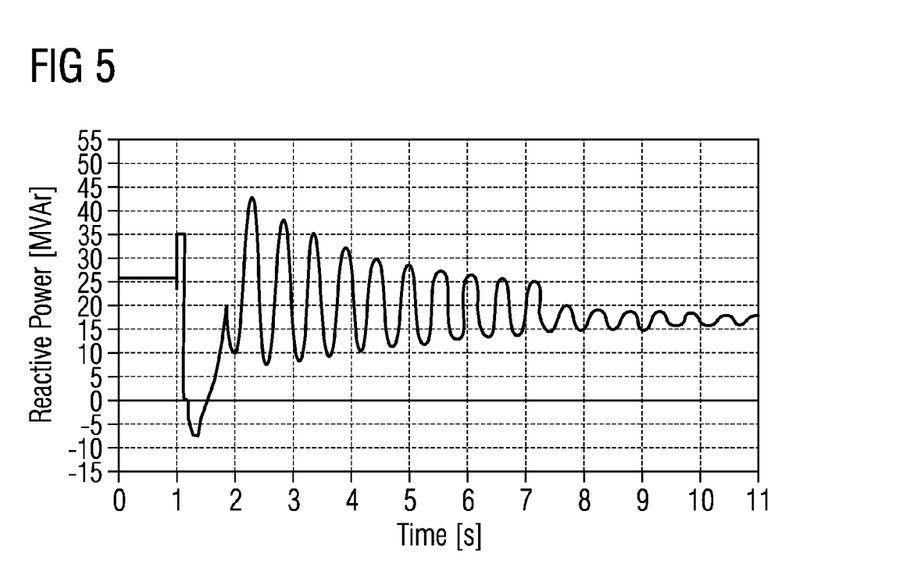
FIG. 5 shows a plot of a simulation of the reactive power generated by the aggregated wind turbines of the wind farm of a prior art fault-ride-through method, wherein forty-nine wind turbines are connected to a feed point of the power system network.

FIG. 5 shows a plot of a simulation of the reactive power generated by the aggregated wind turbines 2 of the wind farm. The total reactive power from an aggregated wind farm transformer is feed into the low voltage bus bar 10 of the wind faun transformer 12. The post fault total amount of reactive power has changed, since the network grid scenario has changed due to the fact that the system protection relay has disconnected the faulted regional transmission line 26.

It is to be noted that the network remains stable and converges within a comparably small time span after the voltage dip caused by the severe fault in regional transmission line 26. The network system converges although regional transmission line 26 and the consumption point of the regional grid system 30 are disconnected from the point of common connection 20.

The specific fault-ride-through recovery requirements are standardized by each transmission system operator, national service provider and distribution service operator of each country by the so called grid code. This grid code defines how a power generating unit must react in case of a voltage-dip.

Figure 6:
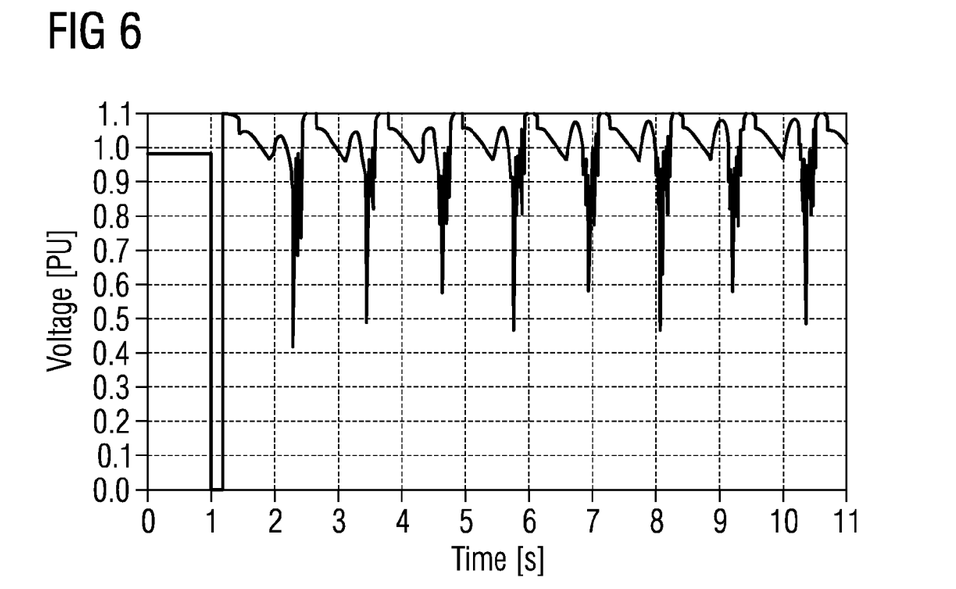
FIG. 6 shows a plot of the relative voltage of the interconnection bus of a prior art fault-ride-through method, wherein fifty wind turbines are connected to a feed point of the power system network.
Figure 7:
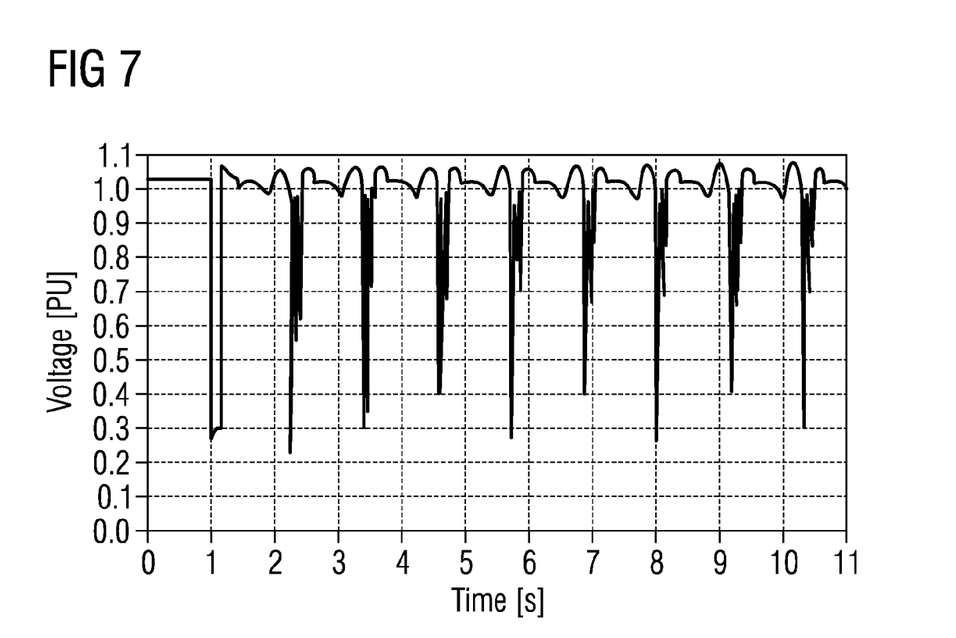
FIG. 7 shows a plot of a simulation of the relative voltage of one of the wind turbine connection lines of a prior art fault-ride-through method, wherein fifty wind turbines are connected to a feed point of the power system network.

FIGS. 6 to 9 show a scenario in which fifty wind turbines 2 are connected via the wind farm transformer 12 and the connection line 18 to the point of common connection 20. FIG. 6 shows a plot of the simulation of the voltage of the common point of connection 20. FIG. 6 corresponds to FIG. 2, wherein FIG. 2 shows a case in which only forty-nine wind turbines form the wind park. FIG. 7 shows a plot of the simulation of the converter voltage of the wind turbine 2 that is feeding power into the wind turbine connection line 4. Thus, FIG. 7 corresponds to FIG. 3, except for the number of connected wind turbines.

Figure 8:
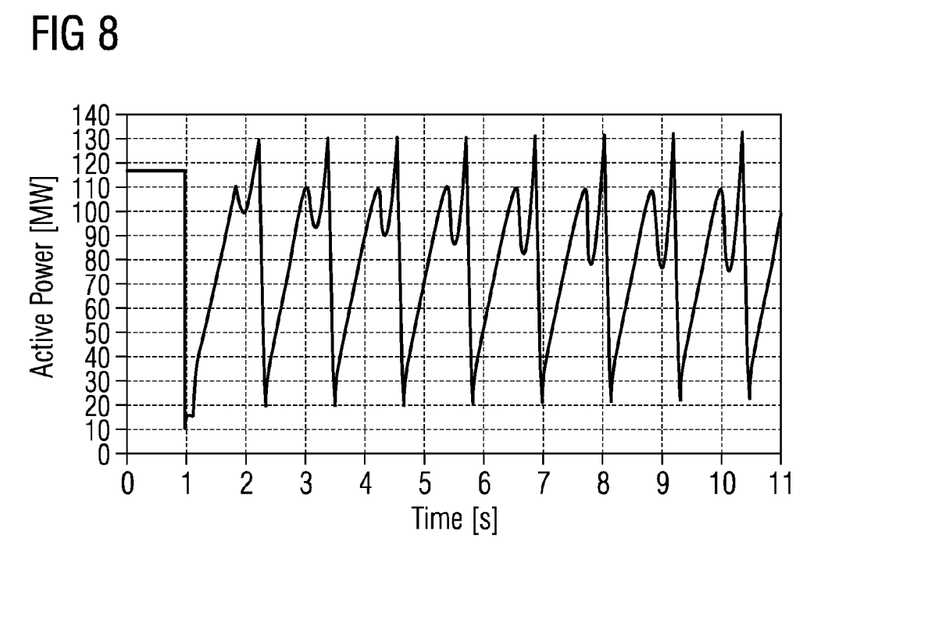
FIG. 8 shows a plot of a simulation of the active power of the aggregated wind farm supplied via the wind farm transformer of a prior art fault-ride-through method, wherein fifty wind turbines are connected to a feed point of the power network.

FIG. 8 shows a plot of a simulation of the total active power from the aggregated wind farm transformer to the low voltage bus bar 10 of the wind farm transformer 12. Accordingly, FIG. 8 corresponds to FIG. 4, which is a simulation of only forty-nine wind turbines connected to the wind park transformer 12.

Figure 9:
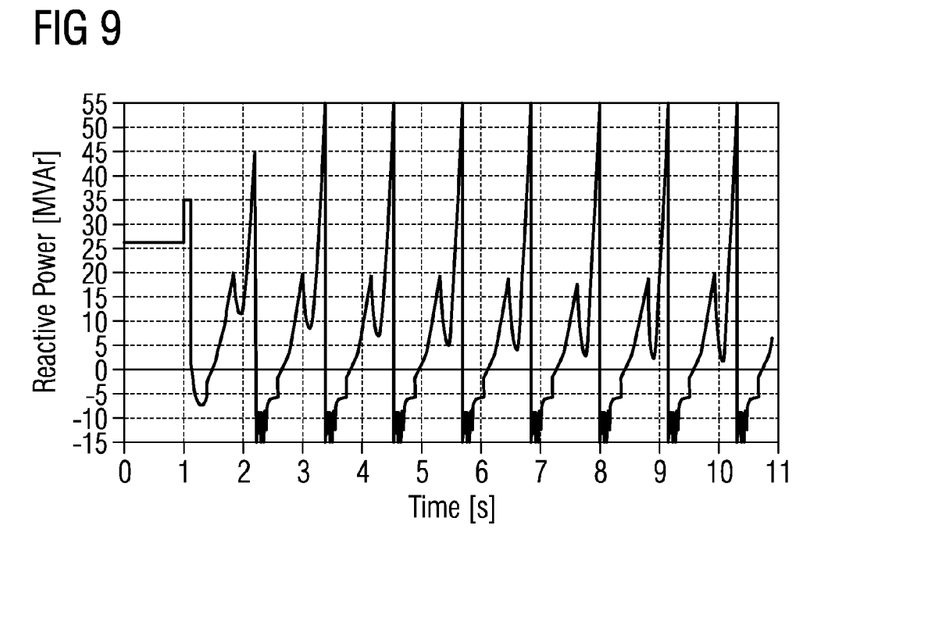
FIG. 9 shows a plot of a simulation of the reactive power generated by the aggregated wind turbines of the wind farm of a prior art fault-ride-through method, wherein fifty wind turbines are connected to a feed point of the power system network.

Finally, FIG. 9 shows a plot of a simulation of the reactive power fed into the low voltage bus bar 10 of the wind farm transformer 12. Thus, FIG. 9 corresponds to FIG. 5.

SUMMARY OF INVENTION

As can be seen in FIGS. 6 to 9 the network gets unstable after the voltage dip caused by the breakdown of the regional transmission line 26. The network, and particularly the voltages and generated power from the wind turbines 2, get unstable, since the connection line, i.e. connection grid, 18 is a very weak grid system. In this case, the entire wind park has to be disconnected from the branch point 14 to which a load 16 is connected.

It is therefore an object of the present invention to overcome the disadvantages of the prior art and to provide a fault-ride-through control that enables stable fault-ride-through, e.g. in a network system with a weak connection grid.

The object of the present invention is achieved by the features of the independent claims.

The fault-ride-through recovery method monitors a power line in order to detect a voltage-dip on the power line transmitting electrical power. Preferably the power line monitored is the power line to which a power generating unit executing the fault-right-through recovery method is connected. If a voltage-dip is detected on the power line, the active current and/or the active power that is fed by the power generating unit at a feeding point into a power network having a plurality of power lines is reduced to a specific, e.g. fixed and/or predefined, value independent of the value of the voltage dip.

The voltage in a power line connecting the power generating unit to a power network can drop to a voltage-dip value due to a short circuit in the power network. The voltage-dip value may be for an example 50%, 30%, 25% or 10% of the pre-voltage-dip value.

A prior art fault-ride-through recovery method reduces the active current and/or the active power fed by the power generating unit into a power network depending on the pre-fault generation and the voltage-dip value. I.e., if the pre-fault generation is rated production and the voltage-dip value is 50% of the pre-fault voltage, the active current and/or active power supplied into the power network is reduced to e.g. 50% of the rated current value of the generating unit.

As has been discussed above with reference to FIGS. 6 to 9, a prior art fault-ride-through and/or post fault active power recovery method causes instabilities if a plurality, particularly a high number, of power generating units, such as wind turbines, are connected over a weak connection grid of a power network system.

The inventors of the present invention have recognized that such instabilities can be avoided, if the active current and/or the active power are reduced to a specific value in case a voltage-dip is detected in a power line. The specific value may be a certain, predetermined and/or fixed value. I.e. the active current and/or the active power fed into the power network is reduced to a specific value independent or not necessary only dependent of the voltage-dip value. Thereby, an improved and stable fault ride through performance of each power generating unit and the entire network or power grid can be achieved. The power generating unit does not have to be disconnected, if a network comprises a weak connection grid for connecting the power generating units, is exposed to severe short circuit faults. Thereby, availability of the entire power network and of each power generating unit is improved.

Particularly advantageous embodiments and features of the invention are given by the dependent claims, as revealed in the following description.

The specific value, i.e. the reduction value, of the active current and/or active power may depend on the properties of the power network, to which the power generating unit is connected. The specific value of the active current and/or active power may depend from the number of power generating units connected to the feeding point of the power network. The properties of the power network may be determined by a connection grid that couples the feeding point to the remaining power network. The feeding point may be coupled via the connection grid to a bus constituting a point of common connection. The properties may be the short circuit capacity, power transfer capacity, impedance and the like of a power line, a connection grid and/or an electric component, such as a transformer, connected thereto.

If a plurality of power generating units is connected to the feeding point of the power network, more power will have to be transferred into the power network via the power line or connection grid coupling the feeding point with the power network.

The specific value of the active current and/or active power may be reduced if the feeding point is connected to the remaining power network by a weak power line or weak connection grid. Further, the specific value of the active current and/or active power may be adjusted, e.g. reduced, if a higher number of power generating units are connected to the power network by a weak power line or weak connection grid. The properties of the power line or connection grid may be determined by the impedance and power transmitting properties of the power line or the connection grid. A weak power line or connection grid may have a higher impedance and/or lower power transfer capacity as compared to a strong power line or connection grid. The fault-ride-through recovery method may be a fault-ride-through active power recovery method.

The fault-ride-through recovery method may have a step of waiting until oscillations of the active current and/or active power have faded out after reducing the active current and/or active power due to the voltage-dip. Subsequently the active current and/or active power may be ramped back, i.e. increased to the value prior to the voltage-dip. Particularly, the fault-ride-through recovery method may comprise a step of waiting until oscillations of the active current and/or active power have been reduced below a pre-determined threshold. Since the active recovery current and/or active power are only increased from a specific value after the fault is cleared and the generator voltage has recovered to a pre-determined threshold, the stability of the generators and entire power network can be ensured. The ramp up may be performed by a specific, particularly pre-determined function, e.g. by a linear function.

This fault-ride-through recovery method is particularly suitable if a plurality of power generating units is connected at a feeding point of a power grid by weak power line or weak connection grid to the power system network. The advanced fault-ride-through and/or post fault active power recovery method can be interpreted as a new and advanced control concept for power generating units for improving and ensuring the stability of the power network system, in particular in situations where a high number of power generating units are connected by a weak power line or connection grid of the power network to the power system network. The advanced fault-ride-through and/or post fault active power recovery method is particularly suitable for wind fauns, which in more and more cases are connected to weak grid systems, since more and more new large wind fauns are located in remote and sparsely populated areas. The wind farms may be located in rear and desolate areas or coast lines or off-shore and thus remote from existing strong power network grids. The advanced fault-ride-through and/or post fault active power recovery method is also suited for power networks that do not have strong interconnection grids for geographical reasons, such as rural and sparsely populated areas in Australia, New Zealand and Americas.

The advanced fault-ride-through and/or post fault active power recovery method increases the active current and/or the active power over a pre-determined and/or specific time period from a specific value when the voltage has regained normal operation conditions to the pre-fault value prior to the voltage-dip by a specific function. In particular, the recovery of the post fault active current and/or the active power are increased essentially linearly. Thereby, the general post fault stability of the weak grid connected wind farm and generating units can be significantly improved.

The pre-determined post fault active current and/or power recovery time period may depend from the properties of the power network, to which the wind farm or power generating units are connected at the point of common connection to the power system and/or from the number of power generating units and their active power production is connected to the feeding point of the power network. As a rule of thumb the specific time period is longer, if more power generating units and as such higher active power production is injected into the feeding point of the power network. Further, the specific time period is increased, if the power network comprises a weak power line or connection grid for connecting the power generating units at the feeding point with the power network. The specific time period may typically be longer than one second and up to several seconds depending of the stationary and dynamic properties of the common connection network grid. The specific and optimised value of the post fault active current and/or specific time period, i.e. the active power ramp back time may be determined by simulation.

Therefore, the invention also discloses a method of determining an appropriate fixed value by a method of simulating a fault-ride-through recovery event. Data of a power network, to which an aggregated power generating unit is to be connected, is provided. The data about the power network may comprise data of a connection grid or power line connecting a feeding point for a power generating unit to the power system network. Data of at least one aggregated power generating unit to be connected to the connection grid is provided. The data of the at least one aggregated power generating unit may comprise the impedance of the power generating unit, the maximum supplied power, complete electrical control and data of the converter and the like. The fault-ride-through recovery may be simulated by simulating the voltages, currents, powers and/or the voltage-dip in the power network and the at least one aggregated power generating unit. It is not necessary to simulate the electric components and values of the entire power network. Typically, only data and electric values relating to steady state and dynamic properties of the power line or connection grid connecting the feeding point to the remaining network has to be considered. The appropriate specific value of the active current and/or active power is depending on the properties of at least a part of the power network and determined by simulating the complete fault-ride-through and/or post fault sequence event. The appropriate specific value may be determined depending on the number of power generating units and generated active power production to be connected to a feeding point of the power network by simulating the fault-ride-through recovery. The appropriate specific value can be determined such that normal operation may be resumed within an acceptable time span without causing instabilities of at least a part of the power network and without risking unstable operation of the power generating units.

Further, the invention also discloses a method of determining an appropriate predetermined time period by simulating a fault-ride-through and/or recovery sequence event. Data of at least a part of the power network, to which a power generating unit is to be connected, is provided. Data of at least one power generating unit to be connected to the power network is provided. The fault-ride-through and/or post fault active current and/or power recovery is simulated by simulating the voltages, powers and/or voltage-dip in at least a part of the power network and in the at least one power generating unit. The appropriate post fault active power restoration time and/or function is determined depending on the properties of at least a part of the power network by simulating the fault-ride-through and/or post fault active power recovery event sequence. The appropriate pre-determined or specific time period and/or function may be determined, depending on the number of power generating units and generated active power production injected at the feeding point of the power network, by simulating the fault-ride-through and/or post fault active power recovery. The pre-determined time period and/or function may be selected such that normal operation is resumed within an acceptable time period after a voltage-dip, and such that no instabilities occur in the power network or in the power generating unit(s). The first and second method of simulating a fault-ride-through and/or post fault active power recovery may be combined.

The invention also discloses a converter comprising a detector for detecting a voltage dip and a reducer that is adapted to execute the advanced fault-ride-through and/or post fault active power recovery method. The detector may be an interface receiving a signal from a monitoring unit or determining unit indicating that a voltage dip occurred.

Each wind turbine comprises one converter. The converter may comprise power electronic components such as thyristors, TRIACs, power-FETs, IGBTs, PWMs and the like.

Further, the invention discloses a power generating unit comprising such converter. The power generating unit may be a wind turbine.

The invention also discloses a wind faun having a plurality of wind turbines, wherein at least one wind turbine comprises the power generating unit mentioned above.

The invention further discloses a computer program product comprising program code means for performing the steps of the fault-ride-through and/or post fault active power recovery method and the method of simulating a fault-ride-through. These methods may be performed on a programmable computer. The advanced fault-ride-through and/or post fault active power recovery method may also be implemented by logic components, which may include programmable logic components.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the drawings, like reference numbers refer to like objects throughout. Objects in the diagrams are not necessarily drawn to scale.

Although the present invention has been disclosed in the form of preferred embodiments and variations thereon, it will be understood that numerous additional modifications and variations could be made thereto without departing from the scope of the invention.

The advanced fault-ride-through and/or post fault active power recovery control method according to the present invention is explained with reference to FIGS. 1 and 10 to 14. Referring to FIG. 1, sixty wind turbines 2 are connected via a wind farm collector bus 10 to a wind farm step-up transformer 12. The sixty wind turbines feed power via the point of common connection or second bus 20 and a regional transmission line 26 into a consumption point of a regional grid system 30. As mentioned above, a consumer 36 consumes power generated by the wind turbines 2 and power transferred from the network grid system e.g. in a first power generating unit 32.

The simulated fault scenario is, as mentioned above, a fault and trip off of regional transmission line 26. Thus, the simulated fault scenario corresponds to the fault scenario discussed under reference to FIGS. 1 to 9 with respect to a prior art fault-ride-though method, except that even more, e.g. 20% more, wind turbines are connected to the power network having a weak connection grid or connection line 18.

Figure 10:
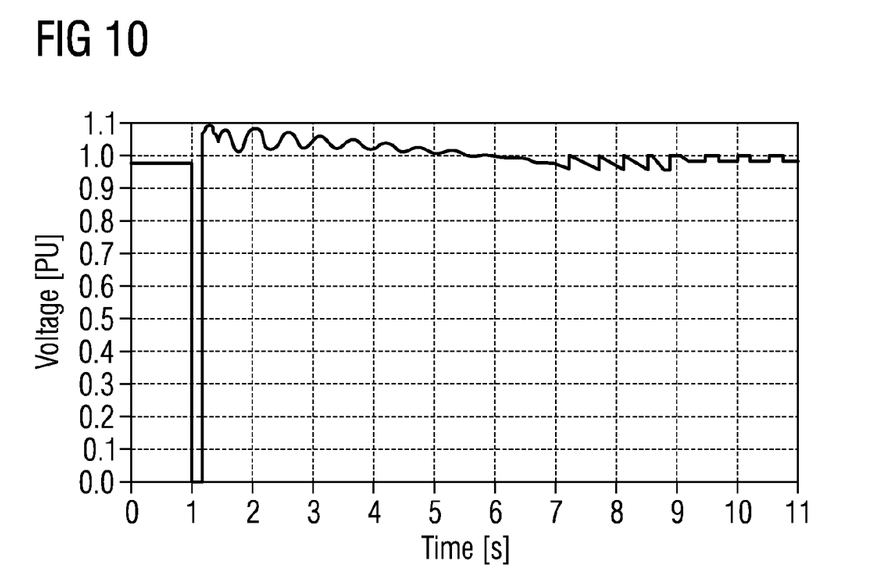
FIG. 10 shows a plot of the relative voltage of an interconnection bus during a fault-ride-through and/or post fault active power recovery control method according to the present invention, wherein sixty wind turbines are connected to a feed point of the power system network.

FIG. 10 shows a plot of a simulation of the relative voltage of the point of common connection 20 during a fault-ride-through. At a point of time of one second a voltage dip occurs, since the regional transmission line 26 is exposed to a short circuit fault and disconnected thereafter. After disconnecting the regional transmission line 26 and initiating the advanced fault-ride-through and/or post fault active power recovery control method, the relative voltage of point of common connection 20 returns to its pre-fault value.

Figure 11:
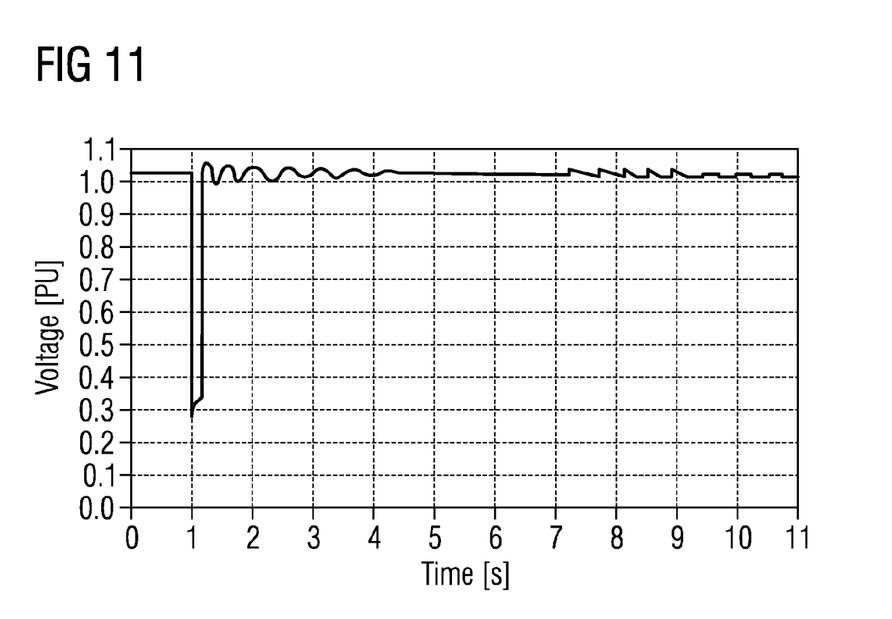
FIG. 11 shows a plot of a simulation of the relative voltage of one of the wind turbine connection lines during a fault-ride-through and post fault active power recovery control method according to the present invention, wherein sixty wind turbines are connected to a feed point of the power system network.

FIG. 11 shows a plot of a simulation of the relative voltage of one of the aggregated wind turbine connection lines 4 during a fault-ride-through according to the present invention. After disconnecting the regional transmission line 26 and initiating the advanced fault-ride-through and/or post fault active power recovery control method, the relative voltage of the wind turbine connection line 4 returns to its pre-fault value.

Figure 12:
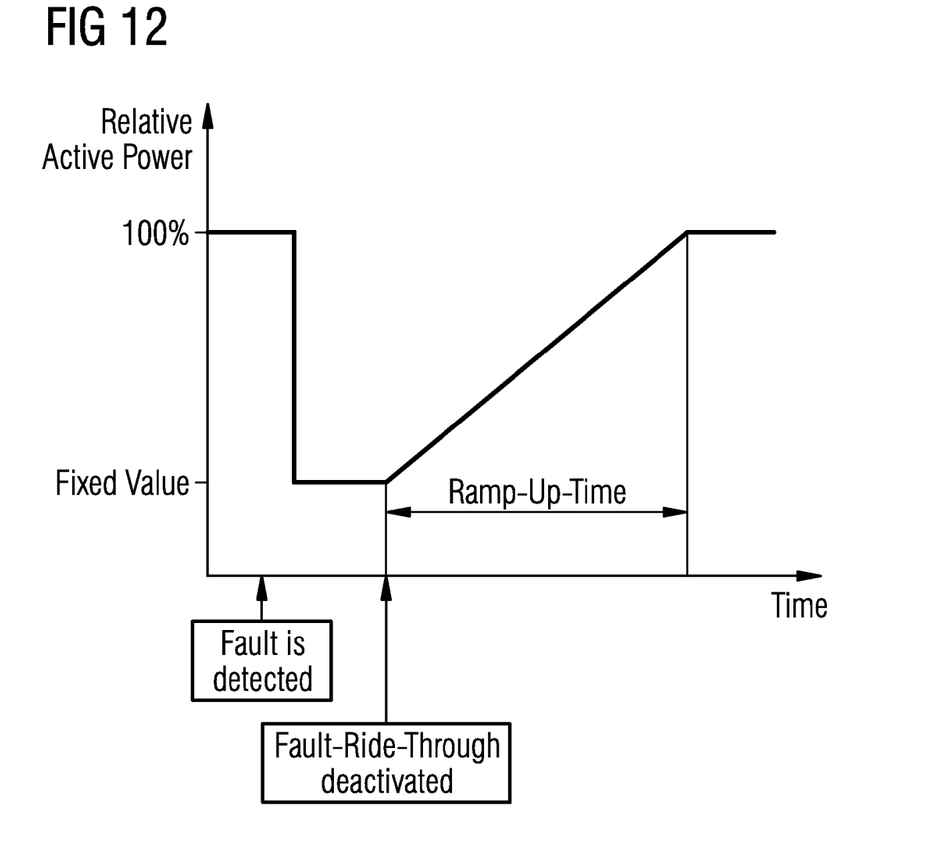
FIG. 12 shows the advanced fault-ride-through and post fault active power recovery control sequence according to the present invention.

FIG. 12 shows the advanced fault-ride-through and post fault active power recovery control sequence according to the present invention. After a fault is detected, the active power and/or current is reduced to a predetermined value. The active power reference is also reduced to specific value. When the fault-ride-through is de-activated, the post fault active power supplied by the wind turbine is increased over the ramp-up time linearly. The ramp-up time may be longer than 2 seconds, preferably longer than 4 seconds, more preferably longer than 6 seconds, most preferably longer than 8 seconds.

Figure 13:
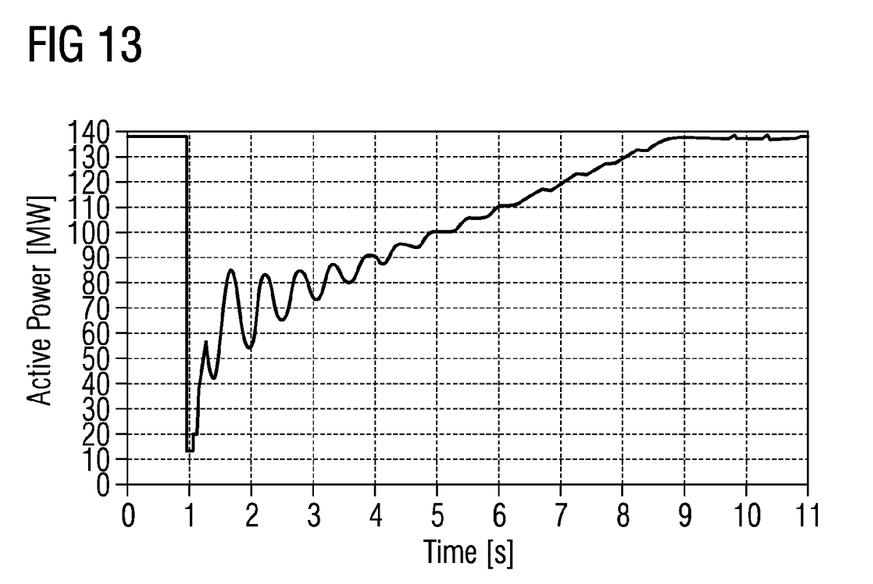
FIG. 13 shows a plot of a simulation of the active power of the aggregated wind farm supplied via the wind farm transformer of a fault-ride-through and/or post fault active power recovery control method according to the present invention, wherein sixty wind turbines are connected to a feed point of the power system network.

FIG. 13 shows a plot of a simulation of the active power of the aggregated wind farm supplied via the wind farm transformer 12 of a fault-ride-through and/or post fault active power recovery control method according to the present invention. After the voltage dip, the active power supplied by each of the wind turbines 2 is reduced to a predetermined value. After the fault-ride-through has been deactivated, the post fault active power is increased over a predetermined time span, preferably the active power is increased linearly. As can be seen from FIG. 13, the active power is increased to the pre-fault value after oscillations have faded out or dropped below a pre-determined threshold. Thereby, the stability and availability of the wind farm and power network can be increased and more wind turbines 2 can be connected to a power network having a weak connection grid 18.

Figure 14:
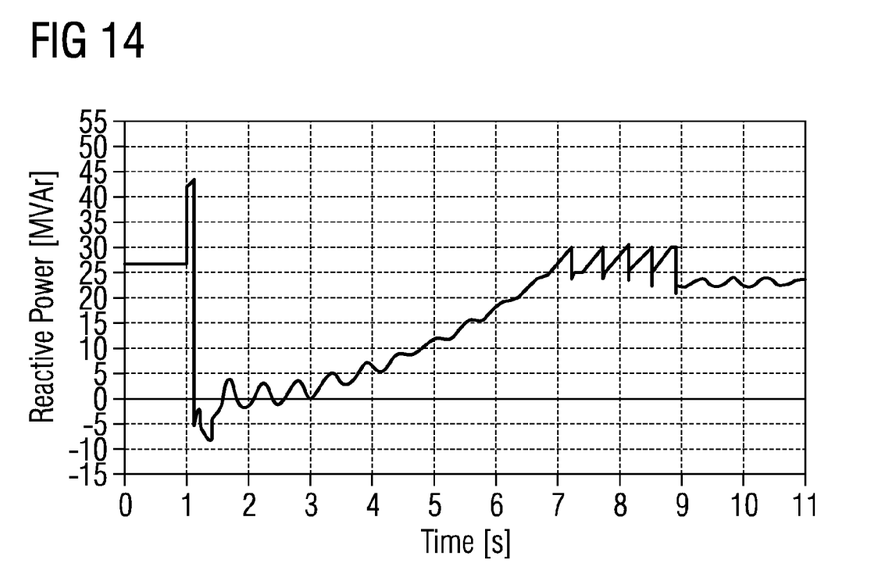
FIG. 14 shows a plot of a simulation of the reactive power generated by the aggregated wind turbines of the wind faun of a fault-ride-through and/or post fault active power recovery control method according to the present invention, wherein sixty wind turbines are connected to a feed point of the power system network.

FIG. 14 shows a plot of a simulation of the reactive power generated by the aggregated wind turbines of the wind farm of a fault-ride-through and/or post fault active power recovery control method according to the present invention. The reactive power reflects the dynamic voltage control of the aggregated wind turbine and is used to provide general support and stabilize the post fault grid voltage. The current and/or power is ramped up to a stable value after oscillations dropped below a pre-determined threshold. Such method improves the stability and availability of the power network, and more wind turbines 2 can be connected to a power network having a weak connection grid 18.

It is to be noted that in the simulation according to FIG. 14, the reactive power is not returning back to its pre-fault value, because the network configuration has changed by disconnecting the regional transmission line 26 and/or the additional grid components connected to consumption point of a regional grid system 30.

Figure 15:
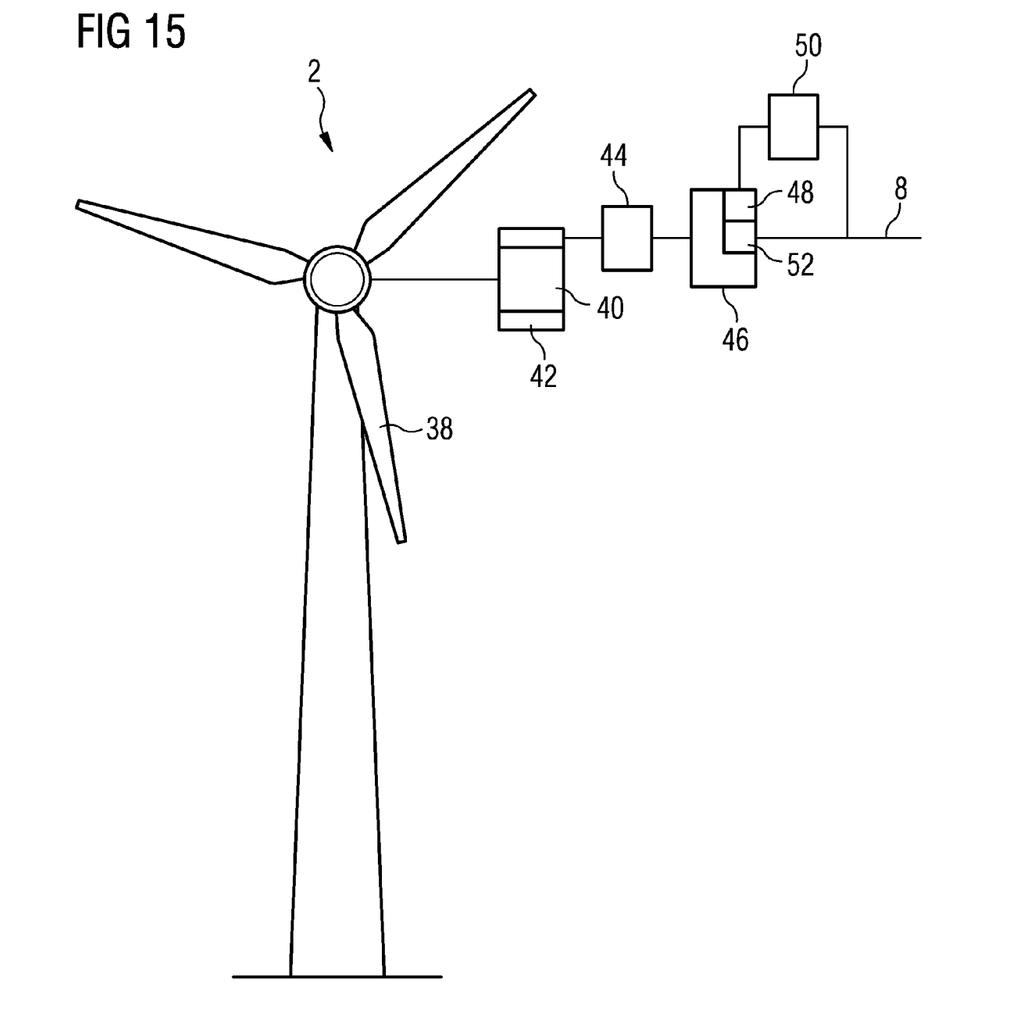
FIG. 15 shows more details of a wind turbine connected to a power line.

Reference is made to FIG. 15 showing more details of the wind turbine. The wind turbine comprises three blades 38. The blades 38 are connected to a rotor 40 of a generator, which rotor 40 is enclosed by a stator 42. The power produced by the generator is rectified via the converter machine bridge from AC to the DC link and further converted by the network bridge inverter and injected into the power network via a wind turbine connection line 8. The wind turbine further comprises a monitoring unit 50 for monitoring the converter terminal voltage and power conditions of the wind turbine connection line 4. In case a voltage dip occurs, the monitoring unit 50 signals to a detector 48 of the converter 46 that a voltage dip is occurring. Thereafter, an advanced fault-ride-through and/or post fault active power recovery control system of a reducer 52 of the converter 46 is triggered to execute the advanced fault-ride-through and post fault active power recovery method mentioned above.

Such a reducer 52 comprises a circuit with power electronic components, such as thyristors, triode for alternating current (TRIACs), power field-effect transistors (power-FETs), insulated-gate bipolar transistors (IGBTs), pulse width modulators (PWMs) and/or software which are configured to reduce the active current and/or power as appropriate according to the invention. Various configurations are possible, as will be known by the skilled person.

The advanced fault-ride-through method according to the present invention may define a new grid code or an auxiliary grid code for power networks in which a plurality of power generating units are connected to a power network having a weak connection grid. Such advanced fault-ride-through method increases the stability and availability of the power network, and more power generating units can be connected to a power network having a weak connection grid For the sake of clarity, it is to be understood that the use of "a" or "an" throughout this application does not exclude a plurality, and "comprising" does not exclude other steps or elements.

The invention claimed is:

1. A fault-ride-through method, comprising:
   detecting a voltage dip on a power line transmitting electric power; and
   if a voltage dip is detected, reducing an active current and/or an active power produced by a power generating unit to a predetermined specific value, which active current and/or active power is fed by the power generating unit at a feeding point into a power network having a plurality of power lines, and
   increasing the active current and/or active power over a predetermined time period from the specific value to a value reached prior to the voltage dip by a specified function,
   wherein the predetermined time period depends from the number of power generating units to be connected to the feeding point of the power network.

2. The method according to claim 1, wherein the specific value of the active current and/or the active power depends from a property of at least a part of the power network to which the power generating unit is connected.

3. The method according to claim 1, wherein the specific value of the active current and/or the specific value of the active power depends from the number of the power generating units connected to the feeding point of the power network.

4. The method according to claim 1, further comprising:
   waiting until oscillations of the active current and/or active power have essentially faded after the reducing of the active current and/or active power; and
   subsequently increasing the active current and/or active power to a value reached prior to the voltage dip.

5. The method according to claim 1, wherein the active current and/or active power are linearly increased.

6. The method according to claim 1, wherein the predetermined time period depends from a property of at least a part of the power network to which the power generating unit is connected at the feeding point.

7. The method according to claim 1, wherein the predetermined time period is longer than 1 s.

8. The method according to claim 1, wherein the predetermined time period is 7 s.

9. The method according to claim 1, wherein the predetermined time period is determined by simulation.

10. A fault-ride-through method, comprising:
    detecting a voltage dip on a power line transmitting electric power; and
    if a voltage dip is detected, reducing an active current and/or an active power produced by a power generating unit to a predetermined specific value determined by a simulation, which active current and/or active power is fed by the power generating unit at a feeding point into a power network having a plurality of power lines,
    wherein the simulation comprises:
      providing data of at least a part of a power network, to which a power generating unit is to be connected;
      providing data of at least one power generating unit to be connected to the power network;

simulating a fault-ride-through or a post fault active power recovery by simulating the voltages, currents, powers and/or voltage dip in at least a part of the power network and the at least one power generating unit, and determining predetermined time interval depending on the number of power generating units to be connected to a feed point of the power network by simulating the fault-ride-through or the post fault active power recovery sequence event.

11. The method according to claim 10, wherein the simulation further comprises determining the specific value depending on a property of at least a part of the power network by simulating the fault-ride-through or the post fault active power recovery.

12. The method according to claim 10, wherein the simulation further comprises determining the specific value depending on the number of power generating units to be connected to a feed point of the power network by simulating the fault-ride-through or the post fault active power recovery sequence event.

13. The method according to claim 10, wherein the simulation further comprises determining the predetermined time interval depending on a property of at least a part of the power network by simulating the fault-ride-through or the post fault active power recovery.

14. A converter for a power generation unit, comprising:
a detector for detecting a voltage dip; and
a reducer for reducing an active current and/or an active power produced by the power generation unit to a predetermined specific value, which active current and/or active power is fed by the power generating unit at a feeding point into a power network having a plurality of power lines, if a voltage dip is detected by the detector, wherein the reducer is operable for increasing the active current and/or active power over a predetermined time period from the specific value to a value reached prior to the voltage dip by a specified function, wherein the predetermined time period depends from the number of power generating units to be connected to the feeding point of the power network.

15. A wind farm, comprising:
plurality of wind turbines, wherein at least one wind turbine comprises a power generating unit, wherein the power generating unit comprises a converter, the converter comprising:
a detector for detecting a voltage dip; and
a reducer for reducing an active current and/or an active power produced by the power generation unit to a predetermined specific value, which active current and/or active power is fed by the power generating unit at a feeding point into a power network having a plurality of power lines, if a voltage dip is detected by the detector, wherein the reducer is operable for increasing the active current and/or active power over a predetermined time period from the specific value to a value reached prior to the voltage dip by a specified function, wherein the predetermined time period depends from the number of power generating units to be connected to the feeding point of the power network.

* * * * *